United States Patent [19]
Siraky

[11] Patent Number: 5,808,185
[45] Date of Patent: Sep. 15, 1998

[54] ANGLE-OF-ROTATION MEASURING DEVICE

[75] Inventor: Josef Siraky, Donaueschingen, Germany

[73] Assignee: Max Stegmann GmbH Antriebstechnik-Elektronik, Donaueschingen, Germany

[21] Appl. No.: 825,391

[22] Filed: Mar. 28, 1997

[30] Foreign Application Priority Data

May 2, 1996 [DE] Germany .......................... 196 17 585.2

[51] Int. Cl.⁶ ...................................................... H02K 7/20
[52] U.S. Cl. .................................................................. 73/116
[58] Field of Search ................................. 73/116, 117.2, 73/117.3

[56] References Cited

U.S. PATENT DOCUMENTS

| | | | |
|---|---|---|---|
| 3,219,862 | 11/1965 | Kieffert | 310/162 |
| 3,383,534 | 5/1968 | Ebbs | 310/257 |
| 3,868,521 | 2/1975 | Schlicker et al. | 310/257 |

FOREIGN PATENT DOCUMENTS 37 17 180  7/1988  Germany .

Primary Examiner—George M. Dombroske
Attorney, Agent, or Firm—Gary M. Nath; Nath & Associates

[57] ABSTRACT

In an angle-of-rotation measuring device, which can be attached to a motor, is a rotor shaft which can be coupled in a force-locked manner to the motor shaft. The stator can be coupled to a fixed motor casing by means of a diaphragm which is fixed in a shape-locked manner to the motor-side end face of the stator by means of its inner region. The diaphragm encloses the stator in a sheath-like manner and has, at its outer rim remote from the motor, a bead which is clamped between the casing and a lid which seals the casing at the end face remote from the motor.

8 Claims, 2 Drawing Sheets

ANGLE-OF-ROTATION MEASURING DEVICE

BACKGROUND TO THE INVENTION

The invention relates to an angle-of-rotation measuring device which can be attached to a motor. In particular, the invention relates to an angle-of-rotation measuring device which can be attached to a motor, having a rotor which can be coupled to the motor shaft, having a stator and having a stator coupling in the form of a rotationally rigid, axially and/or radially flexible diaphragm which is fixed to a fixed motor casing enclosing the stator by means of an outer bead and, on the motor side, to the stator by means of an inner region.

Angle-of-rotation measuring devices of this type serve to determine the angular position, the angle of rotation, the angular velocity or other angle-dependent values of the motor shaft and to provide them for the purposes of indication, control, regulation, evaluation and the like. The angle-of-rotation measuring device has a rotor, which can be coupled to the motor shaft, and a stator which is held stationary with respect to the casing of the motor. The rotor has an angular material measure which is sensed by means of a measurement pickup of the stator. Angular material measures and associated measurement pickups are prior art in very varied designs.

In the case of a measuring device disclosed in DE 44 46 243 C1 of the type mentioned above, the stator is coupled to the motor by means of a rotationally rigid, axially and radially flexible diaphragm. The diaphragm is disposed on that side of the stator which is adjacent to the motor and is fixed by means of an internal region to that side of the stator which is adjacent to the motor. At the outer rim, the diaphragm has a bead which is fixed between the casing of the motor and a casing enclosing the angle-of-rotation measuring device.

The diaphragm disposed axially between the motor and the angle-of-rotation measuring device as stator coupling lengthens the axial attachment dimension. The casing of the angle-of-rotation measuring device has to be mounted on the casing of the motor, the outer bead of the diaphragm having to be fixed between the motor casing and the casing of the angle-of-rotation measuring device. The motor casing must therefore be designed for the attachment of the angle-of-rotation measuring device.

SUMMARY OF THE INVENTION

The invention is based on the aim of providing an angle-of-rotation measuring device which can be attached to a motor and which can be mounted as easily as possible.

Accordingly the present invention provides an angle-of-rotation measuring device which can be attached to a motor, having a rotor which can be coupled to the motor shaft, having a stator and having a stator coupling in the form of a rotationally rigid, axially and/or radially flexible diaphragm which is fixed to a fixed motor casing enclosing the stator by means of an outer bead and, on the motor side, to the stator by means of an inner region, wherein the diaphragm extends so as to enclose the external circumferential surface of the stator from its motor-side region to the bead disposed at that side of the stator which is remote from the motor, the fixed motor casing is sealed by a lid at its end face remote from the motor and the outer bead is clamped between the casing and the lid pressed into the latter.

Advantageous designs and developments of the invention are specified in the subclaims.

In the case of the angle-of-rotation measuring device according to the invention, the diaphragm forming the stator coupling is guided from its inner region fixed to the stator on the motor side to that side of the stator remote from the motor so that it encloses the stator as an envelope on its outer circumferential surface. The outer bead of the diaphragm is consequently situated on that side of the stator which is remote from the motor. The fixed motor casing of the angle-of-rotation measuring device is sealed by a lid at the end face remote from the motor. The outer bead of the diaphragm is fixed between the casing and the lid, for which purpose the lid is pressed into the casing and radially clamps the bead in the process.

The mounting of the angle-of-rotation measuring device when attached to the motor is extremely simple. The angle-of-rotation measuring device is pushed by the end face remote from the motor into the casing and the lid is then pressed in order to clamp the bead of the diaphragm and, consequently, to couple the stator to the fixed motor casing. This mounting does without additional mounting aids, such as screw joints or the like, which would increase the production and assembly cost.

The mounting becomes particularly simple if the rotor of the angle-of-rotation measuring device is also coupled to the motor shaft as a press fit. For this purpose, the rotor shaft is preferably designed as an expansion shaft which, when the angle-of-rotation measuring device is inserted, is pressed axially into an end bore of the motor shaft and is firmly clamped radially in said end bore. In this design, the rotor is also automatically coupled to the motor shaft without additional aids when the angle-of-rotation measuring device is inserted.

The attachment of the casing of the angle-of-rotation measuring device to the casing of the motor is independent of the coupling of the rotor and the stator. Consequently, the angle-of-rotation measuring device can be adapted to the casing of the motor without limitations. In a preferred design, the motor casing has a recess for the angle-of-rotation measuring device so that the motor casing itself encloses the stator and has, at the end face remote from the motor, an opening which can be sealed by the lid for inserting the angle-of-rotation measuring device.

Since the diaphragm forming the stator coupling is fixed to the motor-side end face of the stator only by means of its inner region, whereas the outer bead is clamped to the side remote from the motor, the angle-of-rotation measuring device can be attached in an extremely space-saving manner. The total axial attachment length is scarcely longer than the axial length of the stator.

The fixed motor casing encloses the angle-of-rotation measuring device completely and is sealed off at the end face remote from the motor by the lid. In this connection, the diaphragm bead clamped between the lid and the casing provides an airtight seal. The angle-of-rotation measuring device is enclosed in this way in an airtight and dust-tight manner so that use under difficult ambient conditions is also problem-free.

BRIEF DESCRIPTION OF THE DRAWINGS

The invention is explained in greater detail below by reference to an exemplary embodiment shown in the drawings. In the drawings.

DETAILED DESCRIPTION OF THE PREFERRED EMBODIMENT

Figure 1:
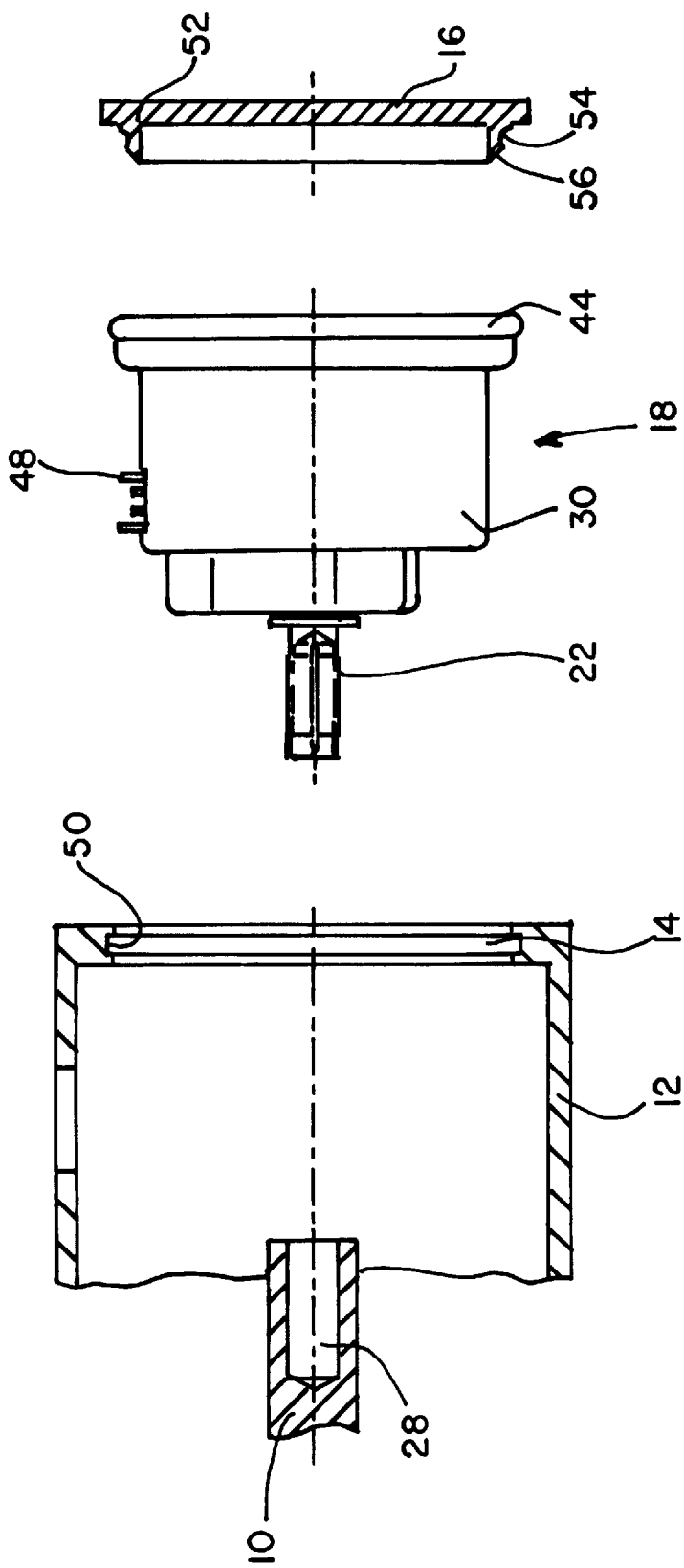
FIG. 1 shows, in exploded form, the installation of the angle-of-rotation measuring device in a partially axially sectioned side view.
Figure 3:
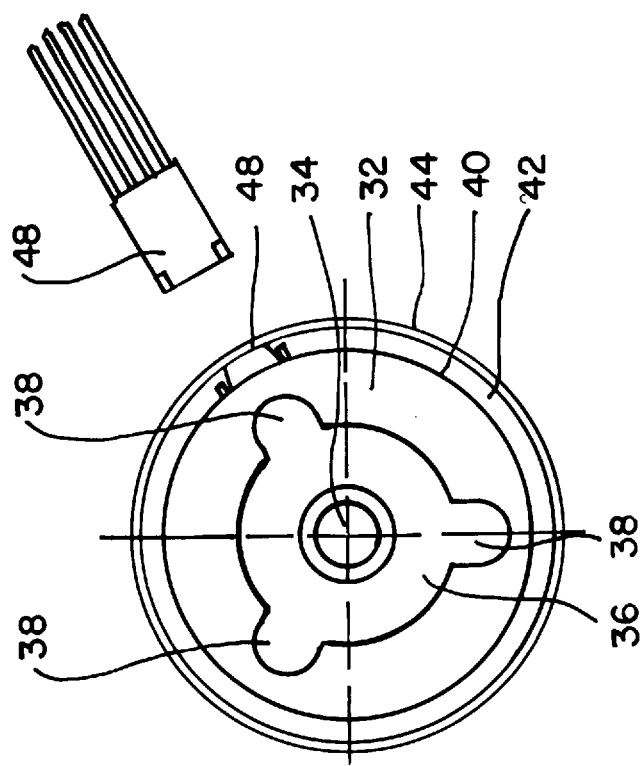
FIG. 3 shows a view of the motor-side end face of the angle-of-rotation measuring device.

The angle-of-rotation measuring device shown as an exemplary embodiment is attached to an electric motor, only the motor shaft 10 of which is shown in the drawing. Provided coaxially with the motor shaft 10 and projecting beyond it in the axial direction is a cylindrical casing 12 which is joined to the casing of the motor in a fixed manner or, preferably, forms an integral extension of the casing of the motor. Provided in that end face of the casing 12 which is opposite the motor shaft 10, i.e. is remote from the motor, is a concentric circular opening 14 which occupies almost the entire end face. The opening 14 can be sealed by a circular disc-shaped lid 16.

Into the casing 12, there can be inserted an angle-of-rotation measuring device 18 which has a stator 20 in which a rotor is mounted in a coaxially rotatable manner. The rotor shaft 22 is brought out of the motor-side end face of the stator 20. To couple the rotor shaft 22 to the motor shaft 10, the shaft stub, projecting out of the stator 20 is designed as an expanding shaft. For this purpose, the rotor shaft 22 is designed, at least in the end region projecting out of the stator 20, as a hollow shaft which has axial slots 24 distributed over the circumference. The webs 26 remaining between the slots 24 are deformed so as to arch slightly outwards. The motor shaft 10 has an axial end bore 28 whose internal diameter corresponds to the diameter of the rotor shaft 22. If the rotor shaft 22 is inserted axially into the end bore 28 of the motor shaft 10, the webs 26 which are deformed so as to arch outwards, apply themselves under radial pressure to the inside wall of the end bore 28, as a result of which the motor shaft 10 and the rotor shaft 22 are coupled to one another in a force-locked manner.

If the angle-of-rotation measuring device 18 is inserted into the casing 12, the stator 20 is coupled to the casing 12 by means of a stator coupling. The stator coupling holds the stator 20 in the casing 12 in a rotationally fixed manner, but permits slight axial and radial movements of the stator 20 with respect to the casing 12. For this purpose, the stator coupling comprises a diaphragm 30 made of a rubber-elastic material.

A radially inner region 32 of the diaphragm 30 is in contact with the motor-side end face of the stator 20. In this arrangement, said region 32 covers the entire end face of the stator 20 except for a central opening 34 through which the rotor shaft 22 passes. The inner region 32 of the diaphragm 30 has an axially protruding shoulder 36 having three radial bulges 38 distributed over the circumference. Corresponding projections of the stator 20 engage in said radial bulges 38 so that the diaphragm 30 is fixed in a shape-locked and rotationally fixed manner to the motor-side end face of the stator 20 by means of its inner region 32. Additional fixing means are not necessary.

Figure 2:
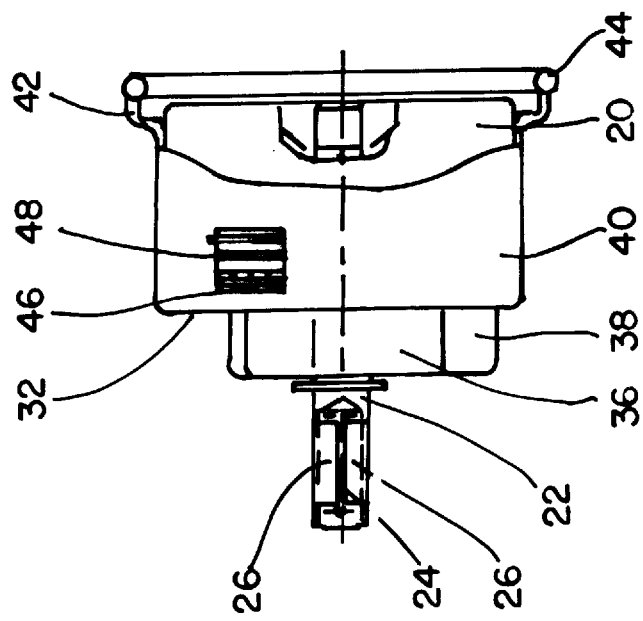
FIG. 2 shows the angle-of-rotation measuring device in a partially axially sectioned side view.

Adjoining the inner region 32 of the diaphragm 30, which inner region is adjacent to the end face of the stator 20, is a cylindrical circumferential surface 40 of the diaphragm 30, which circumferential surface encloses the stator 20 at its outer circumferential surface. The circumferential surface 40 extends over the entire axial length of the stator 20 up to its end side which is remote from the motor. At the end-side rim of the diaphragm 30, the circumferential surface 40 expands radially in a short shoulder 42. The shoulder 42 terminates in a bead 44, which forms an outer termination of the diaphragm 30 of the toroidal sealing ring type. Owing to the radially widened shoulder 42, the bead 44 has a somewhat larger diameter than the external diameter of the stator 20 and is disposed axially slightly in front of that end face of the stator 20 which is remote from the motor, as is clear from FIG. 2.

Provided in the circumferential surface 40 of the diaphragm 30 is an opening 46 for a plug-and-socket connection 48 of the angle-of-rotation measuring device 18.

The opening 14 in that end face of the casing 12 remote from the motor has a circumferential recessed groove 50 on its internal circumference. The lid 16 has an external diameter which is somewhat larger than the diameter of the opening 14. On its end face remote from the casing 12, the lid 16 has a concentrically axially projecting extension 52 whose external diameter corresponds to the internal diameter of the opening 14. Formed in the outer wall of the extension 52 is a circumferential hollow throat 54 which merges into a lead-in cone 56 at the unsupported end of the extension 52. The external diameter of the extension 52 and the internal diameter of the opening 14 correspond to the diameter of the bead 44 of the diaphragm 30.

During the assembly, the angle-of-rotation measuring device 18 is inserted axially into the casing 12 through the opening 14. In this operation, the rotor shaft 22 enters the end bore 28 of the motor shaft 10 and is pressed axially into the latter so that the motor shaft 10 is coupled to the rotor shaft 22. Once the rotor shaft 22 is pressed completely into the end bore 28 of the motor shaft 10, the angle-of-rotation measuring device 18 is completely disposed in the casing 12. The bead 44 of the diaphragm 30 lies in the groove 50 of the opening 14. The lid 16 is then pressed into the opening 14. The extension 52 of the lid is able to pass through the bead 44 owing to the conically narrowed lead-in cone 56 and enters the space between the stator 20 and the widened shoulder 42 of the circumferential surface 40 of the diaphragm 30. When the lid 16 is pressed completely into the opening 14, the bead 44 lies in the hollow throat 54 of the extension 42. In this way, the bead 44 is held and radially clamped in the groove 50 of the opening 14 and the hollow throat 54 of the extension 52 of the lid 16. Consequently, on the one hand, the diaphragm 30 is fixed to the fixed motor casing 12 at its outer rim formed by the bead 44 and, on the other hand, the casing 12 is sealed in an airtight and dust-tight manner by the bead 44 by means of the lid 16.

The assembly of the diaphragm 30 on the stator 20 of the angle-of-rotation measuring device 18, the coupling of the rotor shaft 22 to the motor shaft 10, the coupling of the stator 20 by means of the diaphragm 30 to the casing 12 and the seal-forming closure of the casing 12 are carried out without any adhesive means, screw means or other joining means.

LIST OF REFERENCE SYMBOLS

10 Motor shaft
12 Casing
14 Opening
16 Lid
18 Angle-of-rotation measuring device
20 Stator
22 Rotor shaft
24 Slots
26 Webs
28 End bore
30 Diaphragm
32 Inner region (of 30)
34 Opening (for 22)

36 Shoulder
38 Radial bulges
40 Circumferential surface (of 30)
42 Widened shoulder (of 40)
44 Bead
46 Opening (of 40)
48 Plug-and-socket connector
50 Groove
52 Extension (of 16)
54 Hollow throat
56 Lead-in cone

What is claimed is:

1. Angle-of-rotation measuring device capable of being attached to a motor having a motor shaft and a fixed motor casing, said device comprising;

a rotor capable of being coupled to the motor shaft, a stator having a stator coupling in the form of a rotationally rigid, axially and/or radially flexible diaphragm, said diaphragm being fixedly attachable to the fixed motor casing enclosing the stator by means of an outer bead and, on the motor side, said diaphragm being fixed to the stator by means of an inner region, wherein the diaphragm extends so as to enclose an external circumferential surface of the stator from a motor-side region of the stator to the bead disposed at that side of the stator which is remote from the motor, the fixed motor casing being sealed by a lid at an end face remote from the motor and the outer bead being clamped between the casing and the lid, wherein the outer bead is pressed into the casing.

2. Angle-of-rotation measuring device according to claim 1, wherein the rotor shaft is capable of being coupled to the motor shaft in a force-locked manner.

3. Angle-of-rotation measuring device according to claim 1, wherein the rotor shaft is designed as an expanding shaft capable of being inserted in a force-locked manner into an end bore of the motor shaft.

4. Angle-of-rotation measuring device according to claim 1, wherein the diaphragm is fixed in a shape-locked manner to the stator in the direction of rotation by means of an inner region of the diaphragm.

5. Angle-of-rotation measuring device according to claim 4, wherein the stator engages in a shape-locked manner in bulges of the diaphragm by means of projections disposed at a motor-side end face of the stator.

6. Angle-of-rotation measuring device according to claim 1, wherein the lid engages axially in an opening of an end face of the casing remote from the motor by radially clamping the bead of the diaphragm between the rim of the opening and an extension of the lid.

7. Angle-of-rotation measuring device according to claim 6, wherein the bead is received between a groove in an internal circumference of the motor casing and a hollow throat in an external circumference of the extension of the lid.

8. Angle-of-rotation measuring device according to claim 6, wherein the extension of the lid engages between the external circumferential surface of the stator and a radially widened shoulder of the circumferential surface of the diaphragm.

* * * * *